United States Patent [19]

Valoti et al.

[11] 4,122,135

[45] Oct. 24, 1978

[54] SINTERED GRANULATE PRODUCED FROM ACRYLONITRILE-BUTADIENE-STYRENE COPOLYMER POWDERS

[75] Inventors: GianFranco Valoti, Sesto S. Giovanni (Milan); Giancarlo Antonini, Macherio (Milan), both of Italy

[73] Assignee: Societa' Italiana Resine S.I.R. S.p.A., Milan, Italy

[21] Appl. No.: 755,097

[22] Filed: Dec. 28, 1976

Related U.S. Application Data

[63] Continuation of Ser. No. 580,270, May 23, 1975, abandoned, and Ser. No. 398,508, Sep. 18, 1973, abandoned.

[30] Foreign Application Priority Data

Sep. 20, 1972 [IT] Italy .............................. 29428 A/72

[51] Int. Cl.$^2$ ............................................... C08L 9/00
[52] U.S. Cl. ................................ 260/880 R; 264/140; 264/142; 428/402
[58] Field of Search ........... 264/235, 331, 147, 176 R, 264/140; 260/880 R; 428/402

[56] References Cited

U.S. PATENT DOCUMENTS

| | | | |
|---|---|---|---|
| 3,412,177 | 11/1968 | Griffith | 264/331 |
| 3,531,452 | 9/1970 | Griffith et al. | 264/235 |
| 3,714,320 | 1/1973 | Shaw | 264/176 R |
| 3,732,049 | 5/1973 | Studli | 264/142 |
| 3,733,383 | 5/1973 | Bunney et al. | 264/331 |
| 3,803,286 | 4/1974 | Nakatsuka et al. | 264/331 |

*Primary Examiner*—Jay H. Woo
*Attorney, Agent, or Firm*—Sughrue, Rothwell, Mion, Zinn and Macpeak

[57] ABSTRACT

A sintered granulate produced from acrylo-nitrile-butadiene-styrene copolymer powders. The copolymer powder is exposed to a high pressure and heated to a temperature below the melting point and extruded through nozzles, and the extruded product is chopped into granulate.

5 Claims, No Drawings

SINTERED GRANULATE PRODUCED FROM ACRYLONITRILE-BUTADIENE-STYRENE COPOLYMER POWDERS

This is a continuation of application Ser. Nos. 580,270 and 398,508, filed May 23, 1975 and Sept. 18, 1973, both now abandoned.

This invention relates to a process for the production of sintered granulate from acrylonitrile-butadiene-styrene copolymers in powder form, which is characterized by a usable bulk density, and into which powdered additives, particularly pigments, can be incorporated readily and without dusting.

Acrylonitrile-butadiene-styrene copolymers, which will be referred to hereafter by the abbreviation ABS copolymers, are prepared by mixing rubbery butadiene-acrylonitrile copolymers with styrene-acrylonitrile copolymers or by polymerization of monomeric styrene and acrylonitrile in the presence of a polybutadiene latex. The latter process, which is a graft copolymerization process, may be carried out in emulsion, in bulk, in suspension, or in solution. The ABS copolymers obtained are made e.g. into semi-finished and finished products such as sheets, tubes, and rods by injection moulding or extrusion or further processed by calendering of sheets and hot forming of the sheets. In this process, the ABS copolymers are generally used in the form of pigmented granulate, which may also contain other additives, such as plasticizers, fillers, and stabilizers.

In the graft copolymerization of monomeric styrene and acrylonitrile in the presence of a polybutadiene latex by the emulsion method, the most widely used process, one obtains a latex from which the polymer is obtained by coagulation or evaporation of the latex. In coagulation, solutions of electrolytes are added to the latex at temperatures generally above 80° C. This causes the emulsion to break. The resulting polymer particles stick to one another and form lumps, which generally have a particle size of at least 0.84 mm. Examples of electrolytes that may be used are salts, such as calcium, sodium, and aluminum chlorides and potassium aluminium sulphate, acids such as sulphuric acid and acetic acid, and mixtures of these salts with the acids mentioned or with glycocoll (glycine), polyethylene oxide, or polypropylene oxide, which are also known as polyethylene glycols and polypropylene glycols respectively. The coagulated lumps are then freed from water and coagulant, e.g. by filtration, centrifugation, or sieving, and then dried in conventional driers. One obtains powders having a fraction of about 60 to 70% with a particle size of less than 0.7 mm.

ABS copolymers in powder form are also obtained by spray drying of the latex in hot air chambers. In this process one obtains a powder whose particle size is constantly smaller than 0.7 mm.

Another process consists in the direct drying of the latex on heated rolls or similar devices. In this case the water is evaporated out of the emulsion on the heated rolls. The polymer is scraped off the rolls. The polymer is obtained in the form of flakes of low consistency and very low bulk density. On comminution of these flakes, one obtains a powder having a particle size that is generally between the values obtained by the two processes described above. Difficulties occur in the conversion of this powder into pigmented granulate suitable for the production of finished articles.

In a known process, therefore, the ABS copolymer in powder form is mixed dry with pigments and other additives, and the homogenized mixture is extruded. One obtains rods (spaghetti), which are cut into small cylinders.

The homogenized pigmented ABS copolymer can also be processed in cylinder mixers. This process has the advantage that the ABS copolymer can be effectively mixed with the pigment and other additives. However, the process has certain disadvantages:

the pigmented granulate has a low bulk density, generally from 0.25 to 0.35 g/cm$^3$;

the mixture of the ABS copolymer and pigment in the form of powder is difficult to feed. Because of the phenomenon known as "pulsing" uniform feeding into the processing machine is practically impossible. This results in deterioration of the mechanical quality and of the in-depth colouring of the finished articles;

dusting occurs during the introduction and mixing of the ABS copolymer and the pigment, with the result that other machines are contaminated.

To avoid these disadvantages, unpigmented ABS copolymers are used at present as cylindrical or cubic granulate. For this purpose, the ABS copolymer powder is first granulated by extrusion or calendering in the absence of pigment and additives. The resulting "neutral", i.e. pigment-free granulate is then mixed with the pigment and any other additives and processed to form pigmented granulate. In this process the above mentioned disadvantages are avoided, since the bulk density of the granulate is relatively high; it is generally of the order of 0.6 g/cm$^3$; the processing machine can be fed uniformly even at high throughputs, without the use of devices such as screws or the like, which are absolutely necessary when powders have to be processed. No dusting occurs.

However, this process still has certain disadvantages of the following type:

the cost of the conversion of ABS copolymer powders into neutral granulate is very high;

the mixing or dispersion of pigment into the neutral granulate is difficult.

This results in a decrease in mechanical quality, e.g. the impact strength, particularly when inorganic pigments such as titanium dioxide or carbon black are used.

The purpose of the invention is to provide a simple and economical process for the production of granulate based on ABS copolymers into which pigments can be easily mixed or dispersed. This purpose is achieved by the invention. The object of the invention is accordingly a process for the production of sintered granulate from acrylonitrile-butadiene-styrene copolymers in powder form, characterized in that the copolymer powder is extruded through nozzles of a die in a suitable device under a high pressure and at a temperature below the melting point of the copolymer being treated. In this way the powder is brought into the form of sintered rods or spaghetti, which are then chopped into small cylinders (granulate). Sintered granulate in the form of cubes can also be obtained by the use of a suitable die or a strip granulator (dicer).

It can be seen that when the polymer powder is heated to temperatures considerably below the melting point of the polymer, the powder is not completely melted. Melting occurs at most to a small extent on the surface of the particles, which sinter together in this way.

The process of the invention for the production of sintered granulate is preferably carried out with ABS copolymer powder obtained by graft copolymerization of monomeric styrene and acrylonitrile on a polybutadiene latex by the emulsion polymerization process, followed by coagulation, separation of the coagulum, and drying of the graft polymer. It is well known that about 60 to 70% of the resulting ABS copolymer powder consists of particles having a particle size of less than 0.7 mm.

The process of the invention can also be carried out with ABS copolymer powder obtained by spray drying of a graft copolymer latex or by drying the latex on heated rolls.

In the process of the invention, the graft copolymer powder is preferably exposed to a pressure of about 300 to 500 atm and a temperature of about 120° to 150° C. and extruded through nozzles of a die with a diameter of about 1.5 to 4 mm. The extruded product is then chopped into granulate.

In the process of the invention, the ABS copolymer powder is fed into a granulate extruder, which has knives on its die that cut off the cylindrical strands as granulate. In these devices, either the die or the knife is stationary, i.e. the die is stationary while the knife rotates, or vice versa. The polymer powder is compressed and heated under the action of the friction of the stationary and rotating components. Suitable machines for this purpose are e.g. the pellet mill "Kubex", model DMFJ and DMFC or "Hydrex", model DMFZ manufactured by Buhler, Uzwil, Switzerland. Such pellet mills are normally used for the production of e.g. granulated animal feeds or fertilizers. In these pellet mills, the powder is compressed and heated under controlled conditions to the required high pressure between the rotating die and pressing rolls. These pellet mills are also fitted with scrapers which cut off the emerging material into cubes or cylinders of a certain length.

The rotational speed of the die is adjusted such that the necessary friction is obtained whereby the powder is heated to a surface temperature of from about 120° to 150° C. In order to obtain the necessary pressure of from about 300 to 500 atm a die is used having openings of an appropriate diameter. The obtainable pressure decreases with a major diameter of the openings.

Optimum results are obtained in the process of the invention if the pressure is adjusted to about 400 atm and the temperature to about 135° C. and the powder extruded through the die, whose nozzles have a diameter of about 2.5 mm.

The process of the invention yields sintered granulate of acrylonitrile butadiene-styrene copolymers with relatively high bulk densities, generally of the order of 0.45 g/cm³. The sintered granulate produced in accordance with the invention has all the advantages of the neutral granulate produced by the known process in extruders or in the strip granulator or dicer, but it has the advantage over the known granulates that it can be more easily dispersed and mixed with pigments. The dispersibility of pigment with the sintered granulate produced in accordance with the invention from ABS copolymers is very similar to that in the dispersion or mixing of pigment with ABS copolymer powder. Moreover, the process of the invention for the production of sintered granulate is economically advantageous in relation to the known process for the production of granulate by extruders or in a strip granulator or dicer.

The process of the invention for the production of sintered granulate has been explained in connection with ABS copolymer powder. However, the process can also be carried out with other polymers, such as polyvinyl chloride, copolymers of styrene and/or α-methylstyrene and acrylonitrile and/or alkyl esters of acrylic acid of methacrylic acid, or mixtures of these polymers with acrylonitrile-butadiene-styrene copolymers.

The examples illustrate the invention.

EXAMPLE 1

ABS copolymer powder having the following composition was used in this example:

| | |
|---|---|
| butadiene | 15 wt. % |
| styrene | 65 wt. % |
| acrylonitrile | 20 wt. % |

The ABS copolymer was prepared by graft copolymerization of monomeric styrene and acrylonitrile on a polybutadiene latex by the emulsion process. The particle size of the product is determined by a sieve analysis with sieves having mesh widths or of 0.15 to 2 mm:

Particle size greater than 2 mm = 2 to 3 wt.%;
greater than 1.4 mm = 5 to 6 wt.%;
greater than 1.2 mm = 2 to 3 wt.%;
greater than 1.0 mm = 2 to 3 wt.%;
greater than 0.7 mm = 12 to 15 wt.%;
greater than 0.6 mm = 3 to 6 wt.%;
greater than 0.3 mm = 20 to 30 wt.%;
greater than 0.25 mm = 10 to 15 wt.%;
greater than 0.15 mm = 15 to 20 wt.%;
smaller than 0.15 mm = 10 to 20 wt.%.

This powder is processed in a pellet mill, e.g. of the type "Kubex" model DMFC manufactured by Bühler. This pellet mill is fitted with a die with openings 2.5 mm in diameter. The length of the openings is 5 mm and the width of the die is 62.5 mm. The pressure is 400 atm and the temperature is 135° C. The material emerging from the die is chopped into cylinders about 5 mm long. One obtains a sintered cylindrical granulate that is partly fused on its surface and has a bulk density of 0.4 to 0.45 g/cm³.

This sintered granulate can be easily processed, and no difficulties occur in feeding into the extruder. The mechanical properties of the polymer are not impaired by the process. This is shown by the values of the Izod impact resilience in kg.cm/cm (ASTM D 256) and the heat distortion temperature (ASTM D 648), on comparison of specimens obtained from the powdered ABS copolymer and the sintered granulate produced from it. The results are summarized in Table 1.

EXAMPLE 2

An ABS copolymer obtained by graft copolymerization of monomeric acrylonitrile and styrene on a polybutadiene latex by the emulsion process is used.

The copolymer has the following composition:

| | |
|---|---|
| butadine | 35 wt. % |
| styrene | 50 wt. % |
| acrylonitrile | 15 wt. % |

The particle size distribution of the ABS copolymer powder obtained is similar to that of the ABS copolymer powder used in Example 1. The powder is converted into sintered granulate in accordance with Example 1. The values for the Izod impact resilience and the heat distortion temperature of specimens obtained from the powder and the sintered granulate are shown in Table 1. The sintered granulate obtained can be readily dispersed with pigments.

The value for the impact resilience of specimens obtained from the polymer powder and the sintered granulate pigmented with 1.0 wt.% of cadmium yellow and with 9.0 wt.% of titanium dioxide are given in Table 2. corresponding values are given for specimens obtained from neutral granulate, which was obtained by the known process and pigmented with 1.0 wt.% of cadmium yellow or with 9.0 wt.% of titanium dioxide.

EXAMPLE 3

An ABS copolymer powder obtained by graft copolymerization of monomeric acrylonitrile and styrene on a polybutadiene latex by the emulsion process is used. The polymer has the following composition:

|  |  |
| --- | --- |
| butadiene | 30 wt. % |
| styrene | 50 wt. % |
| acrylonitrile | 20 wt. % |

The particle size distribution of the polymer powder is similar to that of the polymer powder used in Example 1. The powder is converted into sintered granulate in accordance with Example 1. The values for the Izod impact resilience and the heat distortion temperature of specimens obtained from the powder and sintered granulate are given in Table 1. The values for the impact resilience of specimens obtained from the sintered granulate and the polymer powder pigmented with 1.5 wt.% of cadmium yellow, 2.0 wt.% of titanium dioxide, and 9.0 wt.% of titanium dioxide are given in Table 2. Corresponding values are also given for specimens obtained from the neutral granulate obtained by the known process and pigmented with the same quantities of pigment.

EXAMPLE 4

An ABS copolymer powder produced by graft copolymerization of monomeric acrylonitrile and styrene on a polybutadiene latex by the emulsion process is used. The polymer has the following compositions:

|  |  |
| --- | --- |
| butadiene | 25 wt. % |
| styrene | 58 wt. % |
| acrylonitrile | 17 wt. % |

The particle size distribution of this polymer powder is similar to that of the polymer powder of Example 1. The powder is converted into sintered granulate in accordance with Example 1. The values for the impact resilience and the heat distortion temperature of specimens obtained from both the powder and the sintered granulate are given in Table 1.

Table 1.

| Example | Impact resilience, kg.cm/cm | | Heat distortion temperature (° C) | |
| --- | --- | --- | --- | --- |
|  | Powder | Sintered granulate | Powder | Sintered granulate |
| 1 | 9.9 | 9.6 | 90 | 89 |
| 2 | 25.7 | 26.8 | 85 | 85 |
| 3 | 29 | 29 | 83 | 84 |
| 4 | 14.8 | 13.5 | 86 | 86.5 |

Table 2

| Ex. | Pigment | Quantity of pigment wt. % | Impact resilience, kg.cm/cm | | |
| --- | --- | --- | --- | --- | --- |
|  |  |  | Powder | Sintered granulate | Neutral granulate |
| 2 | Cadmium yellow | 1 | 24.9 | 24.0 | 23.1 |
| 2 | Titanium dioxide | 9 | 21.7 | 17.5 | 15.2 |
| 3 | Cadmium yellow | 1.5 | 28.5 | 28 | 27.7 |
| 3 | Titanium dioxide | 2 | 27.5 | 25.3 | 24.1 |
| 3 | Titanium dioxide | 9 | 24.9 | 20 | 18.2 |

What we claim is:

1. A sintered granulate produced by exposing acrylonitrile-butadiene-styrene copolymer powder to a pressure of about 300 to 500 atmospheres and a temperature below the melting point of said powder of about 120° to 150° C., extruding the product of said pressure and heat treatment through nozzles and chopping the product into a granulate.

2. The sintered granulate of claim 1, produced by extruding the product of said pressure and heat treatment through nozzles having a diameter of about 1.5 to 4 millimeters and chopping the product into a granulate.

3. The granulate of claim 1 produced by exposing acrylonitrile-butadiene-styrene copolymer powder to a pressure of about 400 atmospheres and a temperature of about 135° C., extruding the product of said pressue and heat treatment through nozzles having a diameter of about 2.5 mm and chopping the product into a granulate.

4. The granulate of claim 1 having a bulk density of about 0.45 g/cm$^3$.

5. The granulate of claim 1 having a dispersibility in pigment approximately the same as the dispersibility of said copolymer powder in pigment.

* * * * *